(12) United States Patent
Pu et al.

(10) Patent No.: US 11,459,888 B2
(45) Date of Patent: Oct. 4, 2022

(54) AUXILIARY TRANSPORTATION AND SUPPORT SYSTEM USED AFTER RAPID EXCAVATION

(71) Applicant: LANG FANG JING LONG GRAND INDUSTRIAL MACHINERY CO., LTD., Hebei (CN)

(72) Inventors: Changyan Pu, Hebei (CN); Limin Wu, Hebei (CN); Wenguang Cheng, Hebei (CN); Zhiguo Jing, Hebei (CN); Min Zheng, Hebei (CN); Qi Liu, Hebei (CN); Pengfei Fan, Hebei (CN); Zhao Zhang, Hebei (CN)

(73) Assignee: LANG FANG JING LONG GRAND INDUSTRIAL MACHINERY CO., LTD., Hebei (CN)

( * ) Notice: Subject to any disclaimer, the term of this patent is extended or adjusted under 35 U.S.C. 154(b) by 381 days.

(21) Appl. No.: 16/620,887

(22) PCT Filed: Jun. 1, 2018

(86) PCT No.: PCT/CN2018/089488
§ 371 (c)(1),
(2) Date: Dec. 10, 2019

(87) PCT Pub. No.: WO2018/228217
PCT Pub. Date: Dec. 20, 2018

(65) Prior Publication Data
US 2020/0208519 A1    Jul. 2, 2020

(30) Foreign Application Priority Data
Jun. 16, 2017  (CN) .......................... 201710455395.8

(51) Int. Cl.
*E21F 13/00* (2006.01)
*E21D 20/00* (2006.01)
(Continued)

(52) U.S. Cl.
CPC .............. *E21F 13/002* (2013.01); *E21D 9/12* (2013.01); *E21D 20/003* (2013.01);
(Continued)

(58) Field of Classification Search
CPC ......... E21F 13/002; E21F 13/02; E21F 13/06; E21F 13/063; E21D 9/12; E21D 9/122;
(Continued)

(56) References Cited

U.S. PATENT DOCUMENTS 3,268,258 A * 8/1966 Kegel ................... E21D 20/003
198/804
3,621,983 A * 11/1971 Arentzen ................ B65G 21/14
198/313
(Continued)

FOREIGN PATENT DOCUMENTS

CN          104265167 A  *  1/2015  ............... E21B 7/02
CN          104533286 A  *  4/2015  ........... E21B 15/003
(Continued)

OTHER PUBLICATIONS

English language machine translation of Pu et al., CN-104763452-A, published Apr. 22, 2015 (10 pages) (Year: 2015).*

*Primary Examiner* — Abby J Flynn
*Assistant Examiner* — Michael A Goodwin
(74) *Attorney, Agent, or Firm* — Gang Yu

(57) ABSTRACT

An auxiliary transportation and support system used after rapid excavation is provided. The system includes a crushing and transportation device, a roof bolt support device and a side bolt support device. The crushing and transportation device includes a traveling mechanism, a transportation device, a receiving hopper, and a crushing device. The traveling mechanism is located at a bottom of the crushing and transportation device. A chassis is arranged above the traveling mechanism. The transportation device is mounted
(Continued)

on the chassis along a traveling direction of the traveling mechanism. The receiving hopper and the crushing device are both arranged on the transportation device. The roof bolt support device includes a roof bolter, a middle roof bolter and a horizontally telescopic arm which is arranged at a head end of the chassis. The roof bolter is coupled to a movable stretching end of the horizontally telescopic arm.

17 Claims, 5 Drawing Sheets

(51) Int. Cl.
| | | |
|---|---|---|
| *E21D 9/12* | (2006.01) | |
| *E21F 13/06* | (2006.01) | |
| *B65G 41/00* | (2006.01) | |
| *B65G 41/02* | (2006.01) | |
| *E21B 7/02* | (2006.01) | |
| *E21C 35/22* | (2006.01) | |
| *E21F 13/02* | (2006.01) | |

(52) U.S. Cl.
CPC .......... *E21F 13/063* (2013.01); *B65G 41/005* (2013.01); *B65G 41/02* (2013.01); *B65G 2201/045* (2013.01); *E21B 7/025* (2013.01); *E21C 35/22* (2013.01); *E21F 13/02* (2013.01)

(58) Field of Classification Search
CPC ....... E21D 9/126; E21D 20/003; E21C 35/20; E21C 35/22; B65G 41/005; B65G 41/008; B65G 41/02; B65G 69/001; B65G 2201/045; E21B 7/025
See application file for complete search history.

(56) References Cited

U.S. PATENT DOCUMENTS

| | | | | |
|---|---|---|---|---|
| 4,418,872 A * | 12/1983 | Nelson | ................... | E21F 13/002 |
| | | | | 241/101.76 |
| 4,548,442 A * | 10/1985 | Sugden | ..................... | E21D 9/12 |
| | | | | 299/33 |
| 4,758,049 A * | 7/1988 | Wernigg | ............... | E21F 13/002 |
| | | | | 299/33 |
| 5,016,942 A * | 5/1991 | Spross | .................. | E21D 20/003 |
| | | | | 299/33 |
| 5,913,573 A * | 6/1999 | Schlegl | ................. | E21D 20/003 |
| | | | | 299/33 |
| 6,497,536 B1 * | 12/2002 | Neilson | .................. | B25H 3/022 |
| | | | | 299/33 |
| 2010/0119310 A1 | 5/2010 | Yan | | |
| 2015/0050088 A1 | 2/2015 | Wels et al. | | |

FOREIGN PATENT DOCUMENTS

| | | |
|---|---|---|
| CN | 104763452 A | 7/2015 |
| CN | 105971599 A | 9/2016 |
| CN | 106593437 A | 4/2017 |
| CN | 107083979 A | 8/2017 |
| CN | 207093109 U | 3/2018 |

* cited by examiner

AUXILIARY TRANSPORTATION AND SUPPORT SYSTEM USED AFTER RAPID EXCAVATION

CROSS-REFERENCE TO RELATED APPLICATIONS

The present application is a national stage application of International Patent Application No. PCT/CN2018/089488, which is filed on Jun. 1, 2018 and claims priority to Chinese Patent Application No. 201710455395.8, filed on Jun. 16, 2017 and entitled "Auxiliary Transportation and Support System Used after Rapid Excavation", the contents of which are hereby incorporated by reference in its entirety.

TECHNICAL FIELD

The present disclosure relates to a technical field of underground coal mine support operations, and more particularly to an auxiliary transportation and support system used after rapid excavation.

BACKGROUND

With the development of a coal mining technology and the requirements of China's industrial policy, a rapid excavation system has been gradually promoted and applied in China, and the footage speed of many rapid excavation systems has reached the highest level in the world.

An excavating-anchoring unit is integrated excavating and anchoring equipment suitable for rapid excavation of a high-yield and high-efficiency mine coal roadway, which is a new type of excavating equipment developed on the basis of a continuous miner and a cantilever excavator. Compared with the cross-displacement construction process of a continuous miner and an anchor drill, the excavating-anchoring unit combines excavation and support organically, reducing the auxiliary time for frequent displacement of excavation and support equipment. The excavation and support operations are completed on the same equipment. The range of applications is wide. The support effect and the excavation working efficiency have been further improved. It has been praised as a technological revolution in coal roadway excavation.

However, with the improvement of the excavation speed, the current support equipment and technical conditions cannot fully meet the needs of rapid excavation. Especially when the excavating-anchoring machine is matched with a bridge-type transfer machine for reloading and transportation, there are obviously some shortcomings.

1. The cutting efficiency of the excavating-anchoring machine is very high, the instantaneous coal falling capacity can reach 2 tons/min or more, and larger coal pieces will be produced. The matched bridge-type transfer machine is usually used, in combination with a comprehensive excavator, with small transportation capacity and no crushing function. In order to adapt to an auxiliary system, the excavating-anchoring machine can only control the feed rate of each cutting drum, for example, control the feed rate at ½ or ⅓ to reduce the amount of coal falling and control the bulk rate, thus causing low cutting efficiency of the excavating-anchoring machine.

2. It takes only about 5 minutes for the excavator to enter the footage of 1 meter. It takes about 30 minutes to support 7 roof bolts and 8 side bolts. The support time reaches 10 times of the coal cutting time, resulting in low boot rate of the excavating-anchoring machine.

3. The matched bridge type transfer machine has a short length. A transportation belt must be lengthened frequently, which wastes a lot of time, resulting in low efficiency of the auxiliary system.

4. Workers are labor intensive and have certain safety hazards. At present, the 2-3 bolts at a lower part of the side of a roadway need to be supported by manually holding a drilling machine at a rear of the excavating-anchoring machine. It is necessary to lag a certain distance. The side near a belt is about 30 meters, and the other side is about 15 meters. There are safety hazards.

Due to the above deficiencies, the rapid excavation system with the excavating-anchoring machine as the rapid excavation equipment has been difficult to meet the requirements of high-yield and high-efficiency fully mechanized mining. On the other hand, low efficiency of excavation will increase the number of excavation faces, increase the operating costs of coal mines, and put greater pressure on coal mine safety management.

Therefore, how to create an auxiliary transportation and support system after rapid excavation, which simultaneously has the functions of transferring, crushing and bolt and anchor cable support and can rapidly complete full-cross section bolt and anchor cable support operation of a roadway becomes a problem to be urgently solved in the current industry.

SUMMARY

Some embodiments of the present disclosure provide an auxiliary transportation and support system used after rapid excavation, which simultaneously has the functions of transferring, crushing and bolt and anchor cable support and can rapidly complete full-cross section bolt and anchor cable support operation of a roadway, thereby overcoming the deficiencies of the existing support equipment mining disorders.

An embodiment of the present disclosure provides a auxiliary transportation and support system used after rapid excavation, which includes: a crushing and transportation device, a roof bolt support device and a side bolt support device; wherein the crushing and transportation device includes a traveling mechanism, a transportation device, a receiving hopper, and a crushing device; the traveling mechanism is located at a bottom of the crushing and transportation device; a chassis is arranged above the traveling mechanism; the transportation device is mounted on the chassis along a traveling direction of the traveling mechanism; the receiving hopper is arranged at a head end of the transportation mechanism for receiving materials, and the crushing device is fixed on an outer side of the receiving hopper and located above a chute of the transportation device; the roof bolt support device includes a roof bolter, a middle roof bolter and a horizontally telescopic arm, the horizontally telescopic arm is arranged at a head end of the chassis and perpendicular to the traveling direction of the traveling mechanism; the roof bolter is coupled to a movable stretching end of the horizontally telescopic arm, and the middle roof bolter is slidably coupled to an outer side of a fixed end of the horizontally telescopic arm. The side bolt support device includes a stand column slide and a rib bolter, the stand column slide is fixed on a side face of the crushing device, and the rib bolter is slidably coupled to the stand column slide.

In an exemplary embodiment, the auxiliary transportation and support system used after rapid excavation further includes an expandable retractable belt conveyor, which is arranged at a tail of the transportation device.

In an exemplary embodiment, the auxiliary transportation and support system used after rapid excavation includes a working platform disposed on the chassis, wherein the working platform is liftable.

In an exemplary embodiment, the working platform includes a platform body, a lifting oil cylinder and a four-bar linkage mechanism, the platform body being coupled to the chassis through the lifting oil cylinder and the four-bar linkage mechanism in a liftable manner.

In an exemplary embodiment, two sides of the platform body are separately provided with a telescopic pedal, and a silo is arranged on a position, near a tail end of the chassis, of the platform body.

In an exemplary embodiment, the roof bolt support device is mounted on the working platform.

In an exemplary embodiment, the roof bolt support device includes two horizontally telescopic arms, two roof bolters and one middle roof bolter, the two horizontally telescopic arms are superposed on a position, close to the head end of the chassis, of the working platform through a connecting plate, movable stretching ends of the two horizontally telescopic arms are in opposite directions, and the two roof bolters are coupled to the movable stretching ends of the two horizontally telescopic arms respectively; the connecting plate is provided with a horizontal sliding device, and the middle roof bolter horizontally moves through the horizontal sliding device.

In an exemplary embodiment, the crushing and transportation device further includes a telescopic assembly, which is coupled to the chassis and the receiving hopper for driving the receiving hopper, the crushing device and the side bolt support device to move along the traveling direction of the traveling mechanism.

In an exemplary embodiment, the side bolt support device includes two stand column slides and two rib bolters, the two stand column slides are arranged on two sides of the crushing device respectively, and the two rib bolters are slidably coupled to the two stand column slides, respectively.

In an exemplary embodiment, a tail end of the transportation device and the receiving hopper are separately provided with a spray dust reducing device.

With the above design, some embodiments of the present disclosure have at least the following advantages.

1. The auxiliary transportation and support system used after rapid excavation of the present disclosure simultaneously has the functions of transferring, crushing and bolt and anchor cable support and can rapidly complete full-cross section bolt and anchor cable support operation of a roadway. The fully automated operation of the side bolt support is realized. The labor intensity of workers is greatly reduced. The bolt support efficiency is improved. The problem of mining disorders in the conventional art is fundamentally solved.

2. By providing the liftable working platform, it can well meet the anchoring construction at different heights in the roadway.

3. By providing the telescopic pedals on two sides of the platform body, it is convenient to carry out the outwardly extending roof bolt and roof anchor cable operations. The silo is arranged to facilitate the storage of materials required for the support operation.

4. The transportation device further includes a telescopic assembly, which is connected to the chassis and the receiving hopper for driving the receiving hopper, the crushing device and the side bolt support device to move along the traveling direction of the traveling mechanism. The problem of matching with footage time of the excavating-anchoring machine can be effectively solved.

5. Two sides of the transportation device are separately provided with a side bolt support device. The side bolt support device adopting a roadway roof plate as an automatic drilling positioning point can achieve the automatic drilling operations for four side bolt holes in the two sides of the roadway, thereby greatly alleviating the labor intensity of workers and improving the support efficiency.

6. By providing the spray dust-reducing device at the tail end of the transportation device and the receiving hopper, the operation environment on site is effectively improved.

BRIEF DESCRIPTION OF THE DRAWINGS

The above is only an overview of the technical solutions of the present disclosure. In order to more clearly understand the technical means of the present disclosure, the present disclosure will be further described in detail below with reference to the accompanying drawings and specific implementations.

Figure 1:
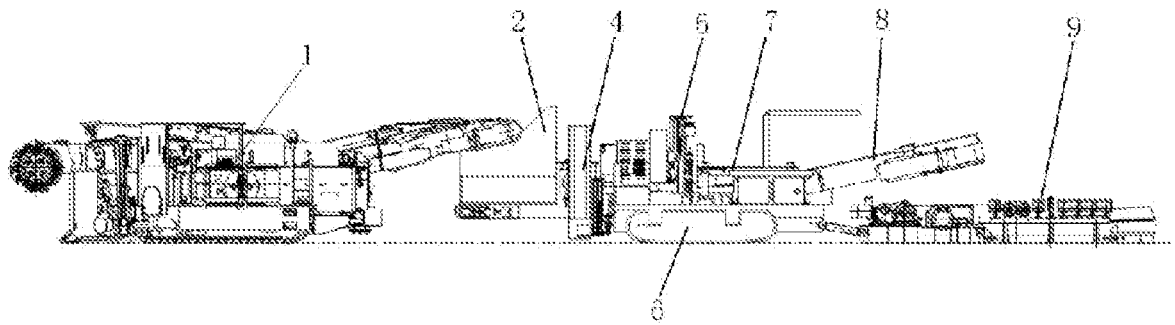
FIG. 1 is a schematic diagram of a use state of an auxiliary transportation and support system used after rapid excavation according to an embodiment of the present disclosure.

1, Excavating-anchoring machine; 2, receiving hopper; 3, crushing device; 4, side bolt support device; 5, roof bolt support device; 6, traveling mechanism; 7, working platform; 8, transportation device; 9, belt conveyor; 10, chassis; 11, stand column slide; 12, rib bolter; 13, roof bolter; 14, middle roof bolter; 15, horizontally telescopic arm; 16, horizontal sliding device; 17, transferring device; 18, platform body; 19, telescopic pedal; 20, operating device; 21, lifting oil cylinder; 22, four-bar linkage mechanism; and 23, silo.

DETAILED DESCRIPTION OF THE EMBODIMENTS

It is to be noted that in the case of no conflict, the features in the embodiments and the embodiments in the present application may be combined with each other. The present disclosure is described below with reference to the drawings and in conjunction with the embodiments in detail.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

It is to be noted that the specification and claims of the present application and the terms "first", "second" and the like in the drawings are used to distinguish similar objects, and do not need to describe a specific sequence or a precedence order. It will be appreciated that the terms used in such a way may be exchanged under appropriate conditions, in order that the embodiments of the present application described here can be implemented in, for example, a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

Exemplary implementations in accordance with the present disclosure will now be described in more detail with reference to the accompanying drawings. However, the exemplary implementations may be embodied in many different forms and should not be construed as being limited to the implementations set forth herein. It is to be understood that the implementations are provided so that the disclosure of the present application will be thorough and complete, and the concept of the exemplary implementations will be fully conveyed to those of ordinary skill in the art, in which the thicknesses of the layers and regions may be expanded for the sake of clarity, the same device is denoted by the same reference numerals, and the description thereof will be omitted.

The present disclosure provides a auxiliary transportation and support system used after rapid excavation, which has the functions of transferring, crushing and bolt and anchor cable support. Through the reasonable support division between the system and the excavating-anchoring machine, a full-cross section bolt and anchor cable support operation of a roadway is rapidly completed, thereby greatly improving a boot rate of the excavating-anchoring machine, realizing a parallel operation of excavating and anchoring, achieving the purpose of efficient and rapid excavation, and overcoming the shortcomings of the existing support equipment and technology.

Figure 2:
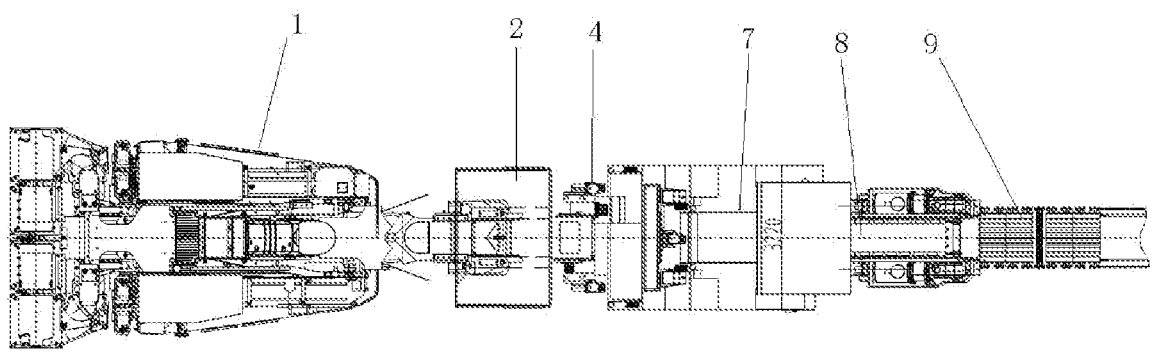
FIG. 2 is a top view of the auxiliary transportation and support system used after rapid excavation in FIG. 1.

FIG. 1 and FIG. 2 show a specific implementation of an auxiliary transportation and support system used after rapid excavation. The system includes a crushing and transportation device, a working platform 7, a roof bolt support device 5, a side bolt support device 4, a belt conveyor 9, a hydraulic system, an electrical system, and an auxiliary system.

Figure 3:
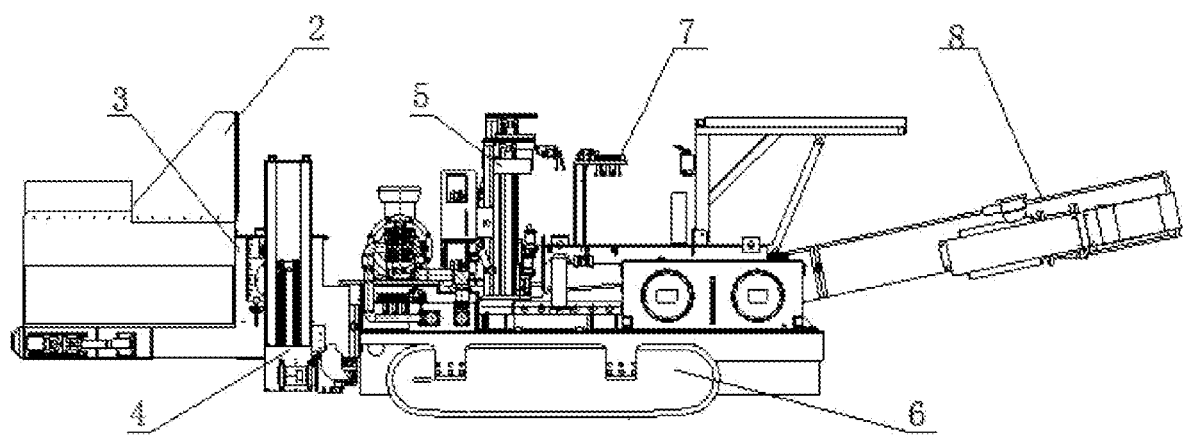
FIG. 3 is a schematic diagram of a partial structure of an auxiliary transportation and support system used after rapid excavation according to an embodiment of the present disclosure.
Figure 4:
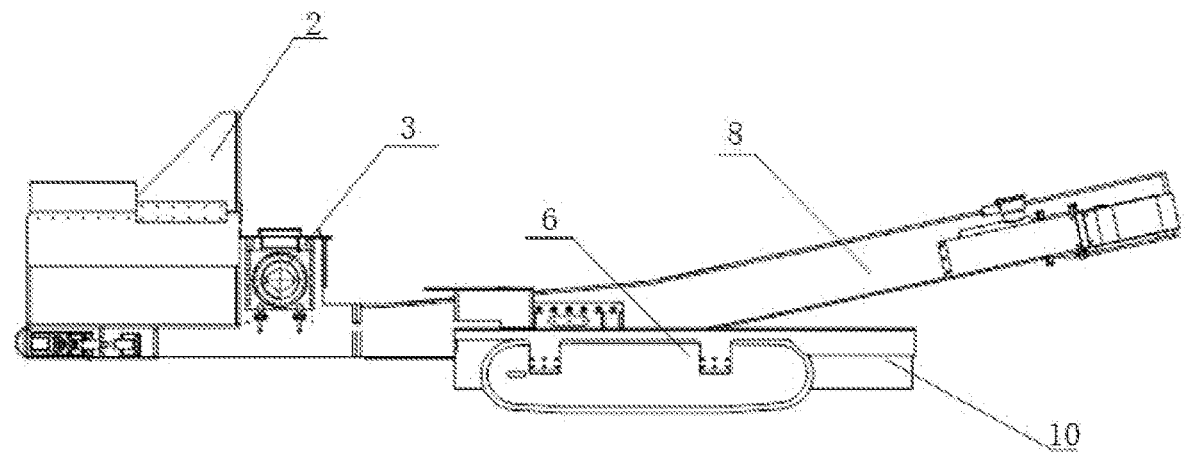
FIG. 4 is a schematic structural diagram of a crushing and transportation device in FIG. 3.

As shown in FIG. 3 and FIG. 4, the crushing and transportation device includes a traveling mechanism 6, a transportation device 8, a receiving hopper 2, a crushing device 3, and a telescopic assembly. The traveling mechanism 6 is located at a bottom of the crushing and transportation device, is a crawler type traveling mechanism 6, and includes a traveling motor, a speed reducer, a creeper tread assembly, a tensioning mechanism, etc. The degree of tension of a track may be adjusted by a telescopic movement of a tightening oil cylinder. The hydraulic system drives the traveling motor to provide a traveling power for the traveling mechanism 6, and drives the traveling mechanism 6 to move forward. The traveling mechanism 6 is equipped with a self-locking valve. When parking is required, the self-locking valve is pressed, that is, the traveling mechanism cannot travel and move. The self-locking valve of the traveling mechanism 6 is opened by a control valve, the traveling motor drives the speed reducer, and a crawler belt is driven by a sprocket wheel to realize traveling.

A chassis 10 is arranged above the traveling mechanism 6. The transportation device 8 is mounted on the chassis 10 along a traveling direction of the traveling mechanism 6. In an exemplary embodiment, the transportation device 8 adopts a scraper conveyor, including a chute, a scraper, a scraper chain, a power source, a drive sprocket, a driven sprocket, a coal shield, and the like. The power source is two motors or may be a motor. The two motors respectively drive the drive sprocket with a speed reduction mechanism, and then drive the scraper chain to operate, thereby realizing the material transportation. The driven sprocket has a tensioning device.

The receiving hopper 2 is arranged at a head end of the transportation device 8 for receiving coal mine transported by a transportation chute of an excavating-anchoring machine 1, and can buffer an instantaneous large amount of coal generated when coal gangue is cut by the excavating-anchoring machine 1, thereby solving the problem that the excavating-anchoring machine 1 cannot realize full-feed-rate cutting. In the present embodiment, the head end corresponds to the traveling direction of the traveling mechanism 6, and the tail end is a direction opposite to the head end. The tail end of the receiving hopper 2 is provided with a coal shield to ensure the safety of an operator. A discharge port at a rear end of the transportation device 8 is matched with a receiving port of a transportation device such as a belt conveyor. In order to improve the operation environment on site, the tail end of the transportation device 8 and the receiving hopper 2 are separately provided with a spray dust reducing device.

In an exemplary embodiment, the crushing device 3 is fixed on an outer side of the receiving hopper 2 and located above a chute of the transportation device 8, and mainly includes a drum, hobbing teeth, a hydraulic motor, and the like. The drum is directly driven by the hydraulic motor, and the drum is provided with the hobbing teeth to break large coal by the rotation impact of the hobbing teeth.

Figure 7:
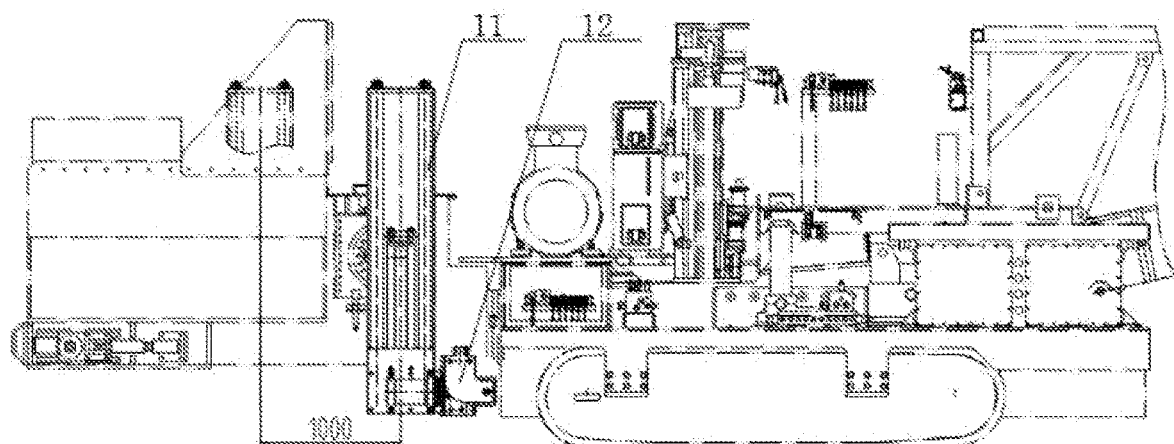
FIG. 7 is a schematic diagram of a telescopic state of a transportation device with reference to a side bolt support device.

As shown in FIG. 7, the telescopic assembly is coupled to the chassis 10 and the receiving hopper 2 for driving the receiving hopper 2 and the crushing device 3 to move in the traveling direction of the traveling mechanism 6. The receiving hopper 2 and the crushing device 3 may be retractable by 1000 mm, about one step length. In actual working, the receiving hopper 2 may be overlapped with the excavating equipment by two step lengths. By providing the telescopic assembly, the receiving hopper 2 is extended forward by one step length, which effectively solves the problem of matching with the footage time of the excavating-anchoring machine 1.

As shown in FIG. 3 and FIG. 7, the side bolt support device 4 includes a stand column slide 11 and a rib bolter 12. In an exemplary embodiment, two stand column slides 11 and two rib bolters 12 are provided. The two stand column slides 11 are fixed on two sides of the crushing device 3 respectively. The two rib bolters 12 are slidably coupled to the two stand column slides 11 respectively. Each of the two rib bolters 12 is slidably up and down along the corresponding stand column slide 11. The each of the rib bolter 12 includes a high strength auger stem and a drill slewing mechanism connected thereto. The rib bolter 12 may adopt a roadway roof plate as an automatic drilling positioning point to rapidly complete the automatic drilling operations for four side bolt holes in the two sides of the roadway. Since the rib bolter 12 is mounted on the crushing device 3 through the stand column slide 11, the rib bolter 12 is retractable by 1000 mm along with the crushing device 3.

Figure 5:
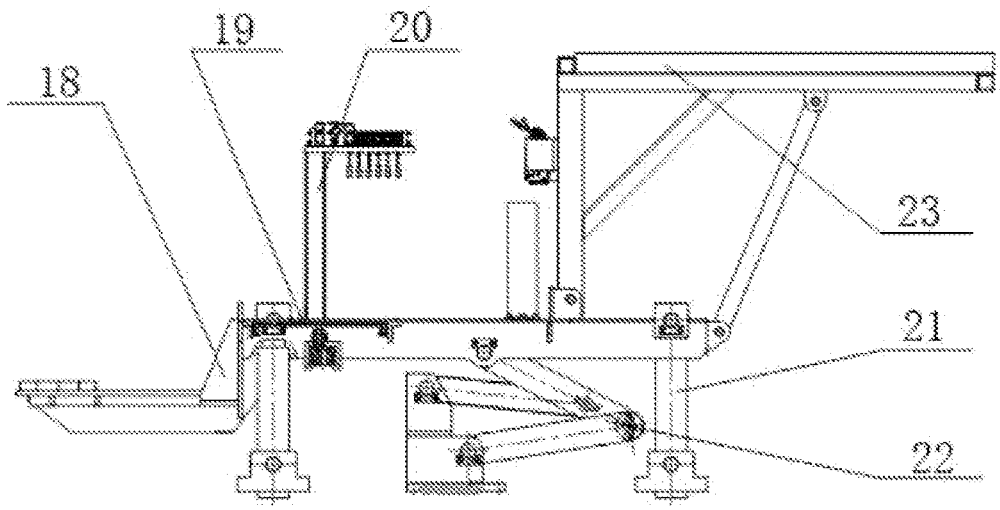
FIG. 5 is a schematic structural diagram of a working platform in FIG. 3.

As shown in FIG. 5, in an exemplary embodiment, the working platform 7 is a liftable working platform, which mainly includes a platform body 18, a lifting oil cylinder 21, a four-bar linkage mechanism 22, telescopic pedals 19, a silo 23, and an operating device 20. Fixed ends of the lifting oil cylinder 21 and the four-bar linkage mechanism 22 are fixedly connected to the chassis 10. The platform body 18 is coupled to movable ends of the lifting oil cylinder 21 and the four-bar linkage mechanism 22. Under the driving of the lifting oil cylinder 21, the lifting operation with an up-down stroke of 1000 mm can be realized, which can well meet the anchoring construction at different height positions in the roadway. The telescopic pedals 19 are arranged on two sides of the platform body 18 and are two-stage telescopic pedals. When the telescopic pedals are fully extended, an 835 mm×605 mm workbench is formed on two sides of the platform body 18 to facilitate the outwardly extending roof bolt and roof anchor cable operations. The silo 23 includes a silo body and a bracket perpendicular to the platform body 18. The silo body is hinged to a rear portion of the platform body 18 through the bracket and configured to store materials required for the support operation. The operating device 20 is arranged in a middle portion of the platform body 18.

Figure 6:
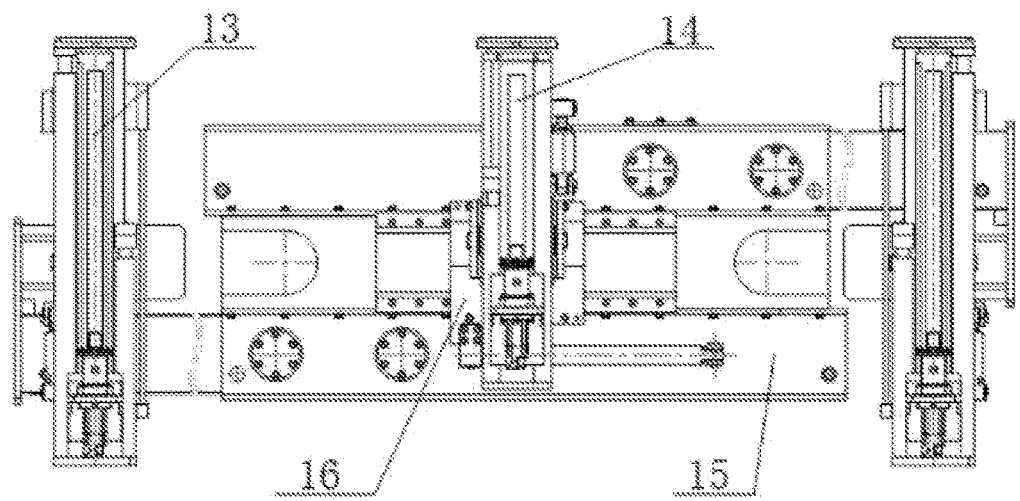
FIG. 6 is a schematic structural diagram of a roof bolt support device in FIG. 3.

As shown in FIG. 3 and FIG. 6, in an exemplary embodiment, the roof bolt support device 5 is arranged at a front end of the working platform 7, and includes two roof bolters 13, a middle roof bolter, a telescopic arm assembly, and a horizontal sliding device 16. The telescopic arm assembly includes two horizontally telescopic arms 15. The two horizontally telescopic arms 15 are superposed on a position, near the head end of the chassis 10, of the working platform 7 through a connecting plate. Movable stretching ends of the two horizontally telescopic arms 15 are in opposite directions. The two roof bolters 13 are connected to the movable stretching ends of the two horizontally telescopic arms 15 respectively. The two roof bolters 13 is extended to both sides by 1.8 meters under the driving of the two horizontally telescopic arms 15 respectively, and may be swung in the front, rear, left and right directions. Compared with the existing roof bolter, the support operation efficiency can be doubled.

In an exemplary embodiment, the horizontal sliding device 16 includes a sliding rail and a sliding block. The sliding rail is fixedly connected to a middle of the connecting plate. The middle roof bolter 14 is mounted on the sliding block and is horizontally moved under the driving of the sliding block, and the middle roof bolter 14 may be further swung back and forth. Through the cooperation of the roof bolter 13 and the middle roof bolter 14, the excavating-anchoring machine can be assisted to rapidly complete the automatic drilling operation of the roof bolt and the anchor cable of the roadway.

The above rib bolter 12, roof bolter 13 and middle roof bolter 14 respectively include sensors, hydraulic cylinders with different strokes, slides, slewing mechanism assemblies, sights, chain assemblies, etc., and may perform automatic drilling operations. The oil cylinders are respectively located at two sides and a lower portion of the slide, the swing mechanism assembly is located above the slide, and the swing mechanism and the oil cylinders are coupled to the slide through the chain assembly.

It is also to be noted that the number of the roof bolters 13 and the middle roof bolters 14 in the roof bolt support device 5 and the number of the rib bolters 12 in the side bolt support device 4 may be changed according to actual needs.

Figure 8:
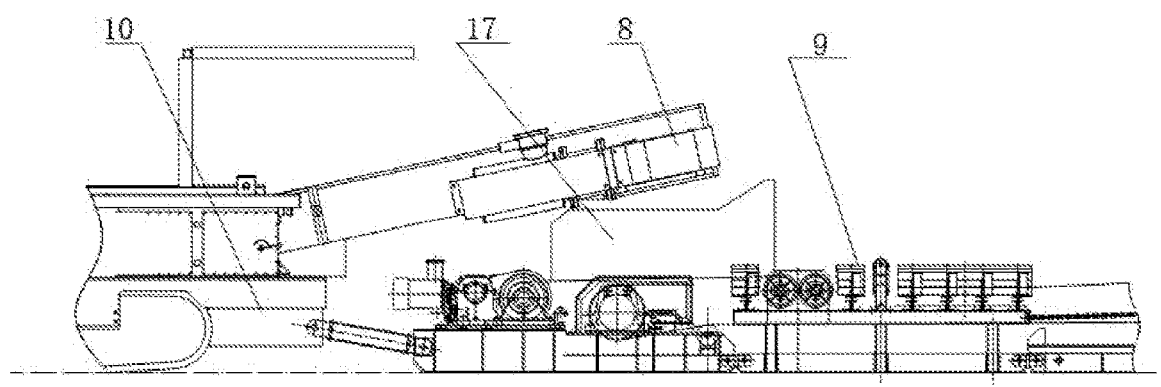
FIG. 8 is a schematic structural diagram of a belt conveyor.
Figure 9:
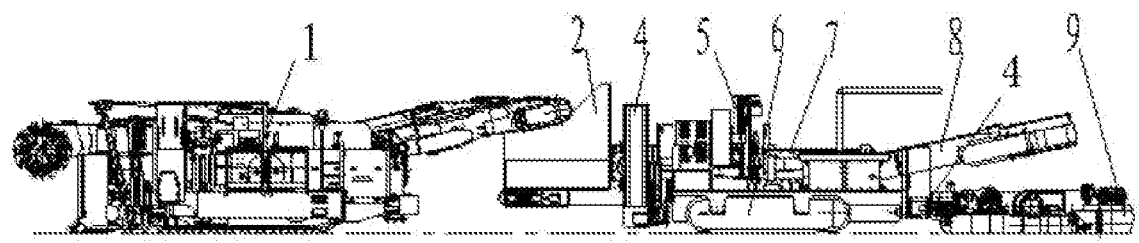
FIG. 9 is a schematic diagram of a use state of an auxiliary transportation and support system used after rapid excavation according to another embodiment of the present disclosure.
Figure 10:
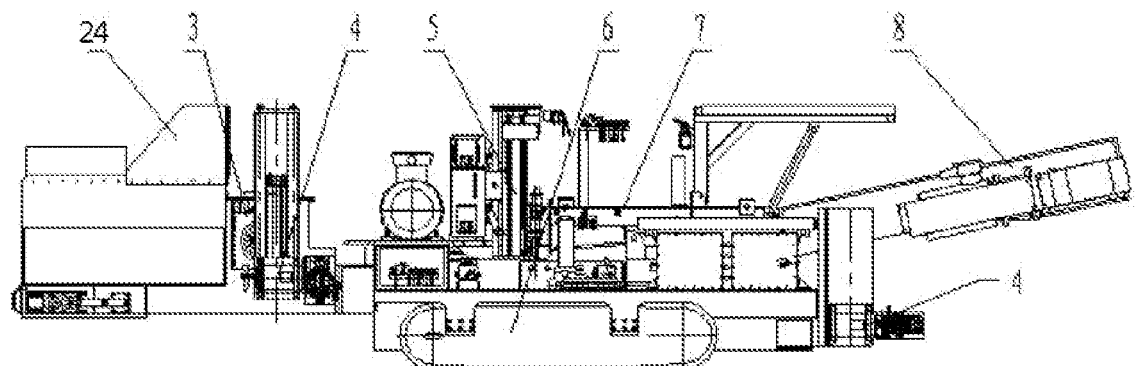
FIG. 10 is a schematic diagram of a partial structure of an auxiliary transportation and support system used after rapid excavation according to another embodiment of the present disclosure.
Figure 11:
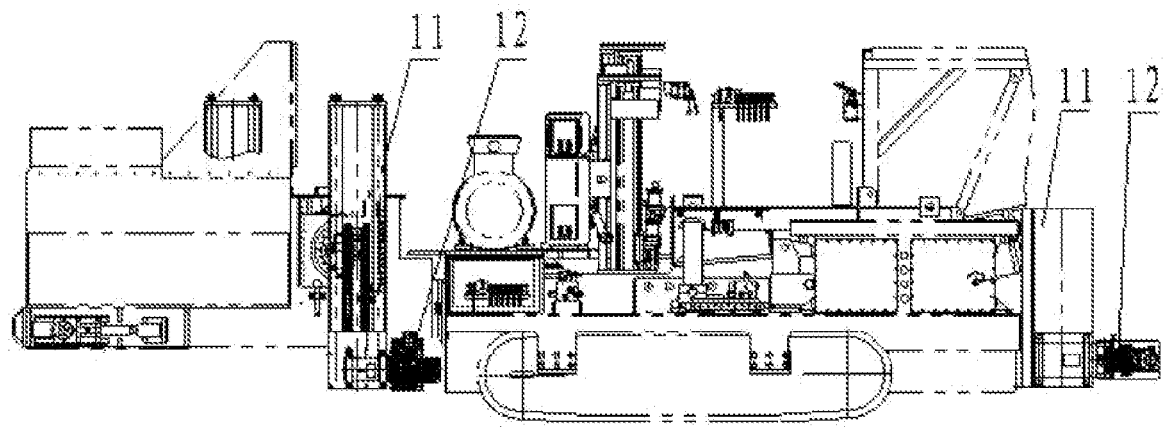
FIG. 11 is a schematic diagram of a telescopic state of a transportation device with reference to a side bolt support device according to another embodiment.
Figure 12:
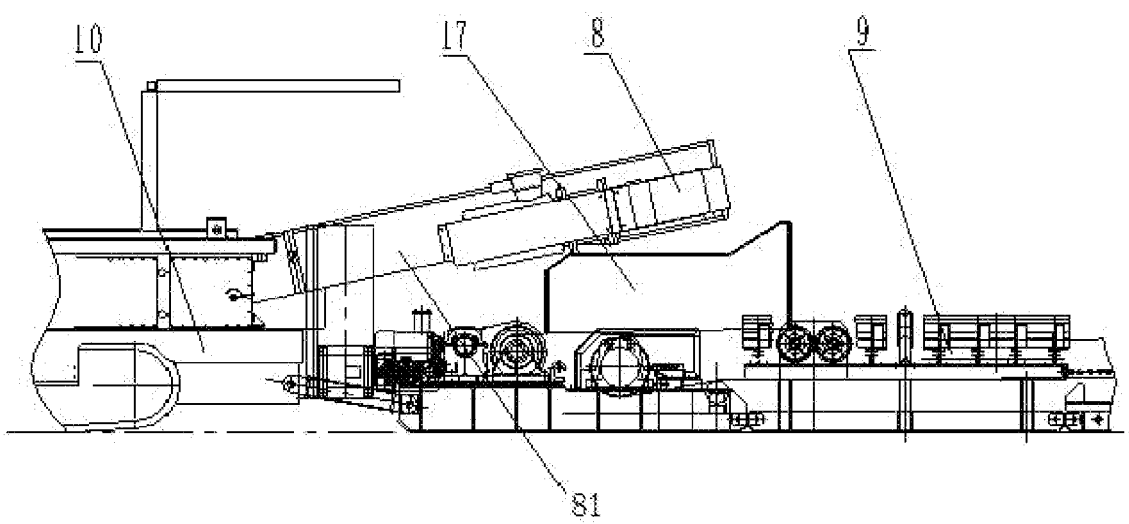
FIG. 12 is a schematic structural diagram of a belt conveyor according to another embodiment.

In an exemplary embodiment, as shown in FIG. 8, the belt conveyor 9 is arranged at the rear end of the transportation device 8, and may be hinged to the chassis 10 of the traveling mechanism 6, which is convenient for dragging. In an exemplary embodiment, an expandable retractable belt conveyor 9 is used. In order to ensure the discharge effect, a transferring device 17 and a discharge hopper are also arranged at the end of the transportation device 8. When a center of the belt conveyor 9 deviates greatly from a center of the transportation device 8, in order to ensure the discharge effect, the discharge hopper is inclined at a certain angle, and whether or not a power discharge mechanism is provided is selected according to an offset distance.

The hydraulic system includes an oil tank, a hydraulic oil pump, a motor, a hydraulic oil cylinder, a balancing valve, a tubing seat, a joint, a hydraulic line, a water pipe, a cooler, and a control valve located on the hydraulic line. The oil tank, the hydraulic oil pump and the electrical system are all fixedly coupled to the chassis 10 through bolts. The hydraulic line is respectively connected to respective corresponding actuators such as the lifting oil cylinder 21, and the actuators obtain power from the hydraulic oil pump through the hydraulic line, and cooperates with the control valve corresponding to the actuator to complete traveling, drilling, crushing, transportation, and the like.

In an exemplary embodiment, the electrical system mainly includes an explosion-proof motor, a switch box, an operation box, an alarm, an emergency stop switch, a mining explosion-proof electric meter, a light rubber sheath soft cable for coal mine, an explosion-proof junction box, a mining voice light signal device, an intrinsically safe electromagnetic starter, a mining headlamp, and various sensor components. The electrical system is connected to an external power supply, and is a power center of the rapid excavation auxiliary transportation and support system. The explosion-proof motor in the electrical system is connected to the hydraulic oil pump of the hydraulic system. The explosion-proof motor starts and drives the hydraulic oil pump to operate, thus providing the actuators with power.

The auxiliary system includes a water system, auxiliary mounting members, an operation panel, and various shields.

In the rapid excavation system, when the excavating-anchoring machine 1 is in a working state, the rapid excavation auxiliary transportation and support system must also be in a working state, and mined coal is transported to the receiving hopper 2 through the transportation chute of the excavating-anchoring machine 1 and then transferred to the expandable retractable belt conveyor through the transportation device 8, while the crushing device 3 breaks a larger coal mass in the transportation device 8 to prevent jamming or damaging the belt transporter 9.

When the side bolt support is required, the rib bolter 12 is operated to slide along the stand column slide 11 to perform drilling operations on different parts of two sides of the roadway. After drilling a row of drills, the telescopic assembly or the telescopic mechanism on the chassis may be driven as required to drive the crushing device 3 forward to perform operations on a next row of holes.

When the roof bolt support is required, the roof bolter 13 is operated by the horizontally telescopic arm 15 to perform the roof bolt drilling operation at different positions. The middle roof bolter 14 is operated to move left and right to realize the support operations of an anchor cable at different positions of a roof. The middle roof bolter 14 may also perform the drilling operation of a roof bolt, that is, may also be used as the roof bolter.

Through the reasonable support division between the auxiliary transportation and support system used after rapid excavation of the present disclosure and the excavating-anchoring machine, the full-cross section bolt and anchor cable support operation of a roadway can be rapidly completed, thereby shortening the support time. Meanwhile, the crushing and transportation device cooperates with the expandable retractable belt conveyor, which significantly improves the transportation efficiency, thereby greatly improving the starting up rate of the excavating-anchoring machine and realizing the parallel operation of excavating and anchoring. Moreover, the labor intensity of workers is greatly alleviated, the construction efficiency of the bolt and anchor cable support is improved, the working conditions are improved, and the site safety is improved. Therefore, the present disclosure fundamentally solves the deficiencies of the existing support equipment and technology.

According to another embodiment of the present disclosure, the side bolt support device 4 includes a stand column slide 11 and a rib bolter 12. In the present embodiment, four stand column slides 11 and four rib bolters 12 are provided. The four stand column slides 11 are fixed on two sides of the crushing device 3 or the chassis 6 respectively. The four rib bolters 12 are slidably connected to the four stand column slides 11, respectively. Each rib bolter 12 is slidably up and down along the stand column slide 11. The rib bolter 12 includes a high strength auger stem and a drill slewing mechanism connected thereto. The rib bolter 12 may adopt a roadway roof plate as an automatic drilling positioning point to rapidly complete the automatic drilling operations for side bolt holes at different heights in the two sides of the roadway. Since a portion of the rib bolter 12 is mounted on the crushing device 3 through the stand column slide 11, the portion of the rib bolter 12 may be retractable by 1000 mm along with the crushing device 3.

In an exemplary embodiment, a auxiliary transportation and support system used after rapid excavation includes: a crushing and transportation device, a roof bolt support device and a side bolt support device. The crushing and transportation device includes a traveling mechanism, a transportation device, a receiving hopper, and a crushing device. The traveling mechanism is located at a bottom of the crushing and transportation device. The transportation device is mounted on the chassis along a traveling direction of the traveling mechanism. The receiving hopper is arranged at a head end of the transportation mechanism for receiving materials and configured to buffer an instantaneous large volume of coal. The crushing device is fixed on an outer side of the receiving hopper and located above a chute of the transportation device. The roof bolt support device includes a roof bolter, a middle roof bolter and a horizontally telescopic arm. The horizontally telescopic arm is arranged on a working platform which is liftable and perpendicular to the traveling direction of the traveling mechanism. The roof bolter is coupled to a movable stretching end of the horizontally telescopic arm. The middle roof bolter is slidably coupled to an outer side of a fixed end of the horizontally telescopic arm. The side bolt support device includes a stand column slide and a rib bolter. The stand column slide is fixed on a side face of the crushing device and a side face of a chassis. The rib bolter is slidably coupled to the stand column slide. The crushing and transportation device and the side bolt support device can move back and forth along the traveling direction of the traveling mechanism. The receiving hopper is configured to receive materials transported by a transportation chute of an excavating-anchoring machine, so as to play the role of buffering an instantaneous large volume of coal generated when coal gangue is cut for the excavating-anchoring machine. A tail end of the receiving hopper is provided with a coal blocking plate. A discharge port at a rear end of the transportation device cooperates with a receiving port of a belt conveyor of the transportation device. The receiving hopper and a tail end of the transportation device are separately provided with a spray dust reducing device.

In an exemplary embodiment, the auxiliary transportation and support system used after rapid excavation further includes an expandable retractable belt conveyor, which is arranged at a tail of the transportation device. The chassis is provided with a liftable working platform. The working platform includes a platform body, a lifting oil cylinder and a four-bar linkage mechanism. The platform body is coupled to the chassis through the lifting oil cylinder and the four-bar linkage mechanism in a liftable manner. Two sides of the platform body are separately provided with a telescopic pedal. A silo is arranged on a position, near a tail end of the chassis, of the platform body. The roof bolt support device is mounted on the working platform.

In an exemplary embodiment, the roof bolt support device includes two horizontally telescopic arms, two roof bolters and one middle roof bolter. The two horizontally telescopic arms are superposed on the working platform through a connecting plate. Movable stretching ends of the two horizontally telescopic arms are in opposite directions of the working platform. The two roof bolters are coupled to the movable stretching ends of the two horizontally telescopic arms respectively. The connecting plate is provided with a horizontal sliding device. The middle roof bolter horizontally moves through the horizontal sliding device.

In an exemplary embodiment, the crushing and transportation device further includes a telescopic assembly, which is connected to the chassis and a fixed seat of the receiving hopper for driving the receiving hopper, the crushing device and a part of the side bolt support device to move along the traveling direction of the traveling mechanism.

In an exemplary embodiment, the side bolt support device includes one or more groups of drilling mechanisms, which are disposed on the front and rear portions of a machine body respectively. Each group of drilling mechanisms includes two stand column slides and two rib bolters. The two stand column slides are arranged on two sides of the crushing device or the chassis respectively. The two rib bolters are slidably connected to the two stand column slides, respectively.

In an exemplary embodiment, as shown in FIG. 9 to FIG. 12, the side bolt support device 4 includes a front group and a rear group of rib bolters respectively located on the front and rear sides of the machine body. The front group of rib bolters is mounted on the transportation and crushing device to move therewith, while the rear group of rib bolters is mounted on the chassis, and the position can be adjusted back and forth.

In addition to the above, it is also to be noted that "one embodiment", "another embodiment", "an embodiment" and the like referred to in the specification refers to specific features, structures or characteristics described in connection with the embodiment are included in at least one embodiment of the general description of the present application. The appearance of the same expression in various places in the specification does not necessarily refer to the same embodiment. Further, when a particular feature, structure, or characteristic is described in conjunction with any embodiment, it is claimed that such feature, structure, or characteristic is also included in the scope of the present disclosure.

In the above embodiment, descriptions of each embodiment are emphasized respectively, and parts which are not elaborated in detail in a certain embodiment may refer to relevant descriptions of other embodiments.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. An auxiliary transportation and support system used after rapid excavation, comprising: a crushing and transportation device, a roof bolt support device and a side bolt support device, wherein the crushing and transportation device comprises a traveling mechanism, a transportation device, a receiving hopper, and a crushing device, the traveling mechanism is located at a bottom of the crushing and transportation device, a chassis is arranged above the traveling mechanism, the transportation device is mounted on the chassis along a traveling direction of the traveling mechanism, the receiving hopper is arranged at a head end of the transportation device for receiving materials, and the crushing device is fixed on an outer side of the receiving hopper and located above a chute of the transportation device;

the roof bolt support device comprises at least one roof bolter, at least one middle roof bolter and at least one horizontally telescopic arm, the horizontally telescopic arm is arranged at a head end of the chassis and perpendicular to the traveling direction of the traveling mechanism, the roof bolter is coupled to a movable stretching end of the horizontally telescopic arm, and the middle roof bolter is slidably coupled to an outer side of a fixed end of the horizontally telescopic arm; and the side bolt support device comprises at least one stand column slide and at least one rib bolter, the stand column slide is fixed on a side face of the crushing device, and the rib bolter is slidably coupled to the stand column slide;

wherein the crushing and transportation device further comprises a telescopic assembly, which is coupled to the chassis and the receiving hopper for driving the receiving hopper, the crushing device and the side bolt support device to move along the traveling direction of the traveling mechanism.

2. The auxiliary transportation and support system used after rapid excavation as claimed in claim 1, further comprising an expandable retractable belt conveyor, which is arranged at a tail of the transportation device.

3. The auxiliary transportation and support system used after rapid excavation as claimed in claim 1, further comprising a working platform disposed on the chassis, wherein the working platform is liftable.

4. The auxiliary transportation and support system used after rapid excavation as claimed in claim 3, wherein the working platform comprises a platform body, a lifting oil cylinder and a four-bar linkage mechanism, the platform body being coupled to the chassis through the lifting oil cylinder and the four-bar linkage mechanism in a liftable manner.

5. The auxiliary transportation and support system used after rapid excavation as claimed in claim 4, wherein two sides of the platform body are separately provided with a telescopic pedal, and a silo is arranged on a position, near a tail end of the chassis, of the platform body.

6. The auxiliary transportation and support system used after rapid excavation as claimed in claim 3, wherein the roof bolt support device is mounted on the working platform.

7. The auxiliary transportation and support system used after rapid excavation as claimed in claim 6, wherein the roof bolt support device comprises two horizontally telescopic arms, two roof bolters and one middle roof bolter, the two horizontally telescopic arms are superposed on a position, close to the head end of the chassis, of the working platform through a connecting plate, movable stretching ends of the two horizontally telescopic arms are in opposite directions, and the two roof bolters are coupled to the movable stretching ends of the two horizontally telescopic arms respectively; and the connecting plate is provided with a horizontal sliding device, and the middle roof bolter horizontally moves through the horizontal sliding device.

8. The auxiliary transportation and support system used after rapid excavation as claimed in claim 1, wherein the side bolt support device comprises two stand column slides and two rib bolters, the two stand column slides are arranged on two sides of the crushing device respectively, and the two rib bolters are slidably coupled to the two stand column slides, respectively.

9. An auxiliary transportation and support system used after rapid excavation, comprising: a crushing and transportation device, a roof bolt support device and a side bolt support device, wherein the crushing and transportation device comprises a traveling mechanism, a transportation device, a receiving hopper, and a crushing device, the traveling mechanism is located at a bottom of the crushing and transportation device, a chassis is arranged above the traveling mechanism, the transportation device is mounted on the chassis along a traveling direction of the traveling mechanism, the receiving hopper is arranged at a head end of the transportation device for receiving materials, and the crushing device is fixed on an outer side of the receiving hopper and located above a chute of the transportation device;

the roof bolt support device comprises at least one roof bolter, at least one middle roof bolter and at least one horizontally telescopic arm, the horizontally telescopic arm is arranged at a head end of the chassis and perpendicular to the traveling direction of the traveling mechanism, the roof bolter is coupled to a movable stretching end of the horizontally telescopic arm, and the middle roof bolter is slidably coupled to an outer side of a fixed end of the horizontally telescopic arm; and the side bolt support device comprises a stand column slide and a rib bolter, the stand column slide is fixed on a side face of the crushing device, and the rib bolter is slidably coupled to the stand column slide, wherein the receiving hopper is configured to receive coal transported by a transportation chute of an excavating-anchoring machine, so as to play a role of buffering an instantaneous large volume of coal generated when the coal is cut by the excavating-anchoring machine, a tail end of the receiving hopper is provided with a coal blocking plate, a discharge port at a rear end of the transportation device cooperates with a receiving port of a belt conveyor, and the receiving hopper and a tail end of the transportation device are separately provided with a spray dust reducing device;

wherein the crushing and transportation device further comprises a telescopic assembly, which is coupled to the chassis and the receiving hopper for driving the receiving hopper, the crushing device and the side bolt support device to move along the traveling direction of the traveling mechanism.

10. The auxiliary transportation and support system used after rapid excavation as claimed in claim 9, further comprising an expandable retractable belt conveyor, which is arranged at a tail of the transportation device.

11. The auxiliary transportation and support system used after rapid excavation as claimed in claim 9, further comprising a working platform disposed on the chassis, wherein the working platform is liftable, the working platform comprises a platform body, a lifting oil cylinder and a four-bar linkage mechanism, the platform body is coupled to the chassis through the lifting oil cylinder and the four-bar linkage mechanism in a liftable manner, two sides of the platform body are separately provided with a telescopic pedal, a silo is arranged on a position, near a tail end of the chassis, of the platform body, and the roof bolt support device is mounted on the working platform.

12. The rapid excavation auxiliary transportation and support system as claimed in claim 11, wherein the roof bolt support device comprises two horizontally telescopic arms, two roof bolters and one middle roof bolter, the two horizontally telescopic arms are superposed on the working platform near the head end of the chassis through a connecting plate, movable stretching ends of the two horizontally telescopic arms are in opposite directions of two sides of the working platform, and the two roof bolters are coupled to the movable stretching ends of the two horizontally telescopic arms respectively; and the connecting plate is provided with a horizontal sliding device, and the middle roof bolter horizontally moves through the horizontal sliding device.

13. The rapid excavation auxiliary transportation and support system as claimed in claim 9, wherein the side bolt support device comprises one or more groups of drilling mechanisms disposed on a front and rear portions of a machine body respectively, each group of drilling mechanisms comprises two stand column slides and two rib bolters, the two stand column slides are arranged on two sides of the crushing device or the chassis respectively, and the two rib bolters are slidably coupled to the two stand column slides, respectively.

14. An auxiliary transportation and support system used after rapid excavation, comprising: a crushing and transportation device, a roof bolt support device and a side bolt support device, wherein the crushing and transportation device comprises a traveling mechanism, a transportation device, a receiving hopper, and a crushing device, the traveling mechanism is located at a bottom of the crushing and transportation device, the transportation device is mounted on a chassis along a traveling direction of the traveling mechanism, the receiving hopper is arranged at a head end of the transportation device for receiving materials and configured to buffer an instantaneous large volume of coal, and the crushing device is fixed on an outer side of the receiving hopper and located above a chute of the transportation device;

the roof bolt support device comprises at least one roof bolter, at least one middle roof bolter and at least one horizontally telescopic arm, the horizontally telescopic arm is arranged on a working platform which is liftable and the horizontally telescopic arm is perpendicular to the traveling direction of the traveling mechanism, the roof bolter is coupled to a movable stretching end of the horizontally telescopic arm, and the middle roof bolter is slidably coupled to an outer side of a fixed end of the horizontally telescopic arm;

the side bolt support device comprises a stand column slide and a rib bolter, the stand column slide is fixed on a side face of the crushing device and a side face of the chassis, and the rib bolter is slidably coupled to the stand column slide; and the crushing and transportation device and the side bolt support device is configured to move back and forth along the traveling direction of the traveling mechanism, wherein the receiving hopper is configured to receive materials transported by a transportation chute of an excavating-anchoring machine, so as to play a role of buffering an instantaneous large volume of coal generated when coal gangue is cut for the excavating-anchoring machine, a tail end of the receiving hopper is provided with a coal blocking plate, a discharge port at a rear end of the transportation device cooperates with a receiving port of a belt conveyor, and the receiving hopper and a tail end of the transportation device are separately provided with a spray dust reducing device;

wherein the crushing and transportation device further comprises a telescopic assembly, which is coupled to the chassis and a fixed seat of the receiving hopper for driving the receiving hopper, the crushing device and the side bolt support device to move along the traveling direction of the traveling mechanism.

15. The auxiliary transportation and support system used after rapid excavation as claimed in claim 14, further comprising an expandable retractable belt conveyor arranged at a tail of the transportation device and a working platform disposed on the chassis, wherein the working platform is liftable, the working platform comprises a platform body, a lifting oil cylinder and a four-bar linkage mechanism, the platform body is coupled to the chassis through the lifting oil cylinder and the four-bar linkage mechanism in a liftable manner, two sides of the platform body are separately provided with a telescopic pedal, a silo is arranged on a position, near a tail end of the chassis, of the platform body, and the roof bolt support device is mounted on the working platform.

16. The auxiliary transportation and support system used after rapid excavation as claimed in claim 15, wherein the roof bolt support device comprises two horizontally telescopic arms, two roof bolters and one middle roof bolter, the two horizontally telescopic arms are superposed on the working platform through a connecting plate, movable stretching ends of the two horizontally telescopic arms are in opposite directions of two sides of the working platform, and the two roof bolters are coupled to the movable stretching ends of the two horizontally telescopic arms respectively; and the connecting plate is provided with a horizontal sliding device, and the middle roof bolter horizontally moves through the horizontal sliding device.

17. The auxiliary transportation and support system used after rapid excavation as claimed in claim 14, wherein the side bolt support device comprises one or more groups of drilling mechanisms, which are disposed on a front and rear portions of a machine body respectively, each group of drilling mechanisms comprises two stand column slides and two rib bolters, the two stand column slides are arranged on two sides of the crushing device or the chassis respectively, and the two rib bolters are slidably coupled to the two stand column slides, respectively.

* * * * *

UNITED STATES PATENT AND TRADEMARK OFFICE
CERTIFICATE OF CORRECTION

| | |
|---|---|
| PATENT NO. | : 11,459,888 B2 |
| APPLICATION NO. | : 16/620887 |
| DATED | : October 4, 2022 |
| INVENTOR(S) | : Changyan Pu et al. |

It is certified that error appears in the above-identified patent and that said Letters Patent is hereby corrected as shown below:

On the Title Page

Item (73) Assignee:
Please replace [[LANG FANG JING LONG GRAND INDUSTRIAL MACHINERY CO., LTD., LANGFANG, HEBEI (CN)]] with --HE BEI JING LONG INTELLIGENT EQUIPMENT CO., LTD., LANGFANG, HEBEI (CN)--

Signed and Sealed this
Twentieth Day of February, 2024

Katherine Kelly Vidal
*Director of the United States Patent and Trademark Office*